(12) United States Patent
Hirschsohn

(10) Patent No.: US 12,203,560 B2
(45) Date of Patent: Jan. 21, 2025

(54) AXIAL MULTI-STAGE, MULTI-PATH CONTROL VALVE ELEMENT DESIGN FOR EXTERNAL PLUGS

(71) Applicant: Control Components, Inc., Rancho Santa Margarita, CA (US)

(72) Inventor: Robert Hirschsohn, Rancho Santa Margarita, CA (US)

(73) Assignee: CONTROL COMPONENTS, INC., Rancho Santa Margarita, CA (US)

( * ) Notice: Subject to any disclaimer, the term of this patent is extended or adjusted under 35 U.S.C. 154(b) by 43 days.

(21) Appl. No.: 18/138,885

(22) Filed: Apr. 25, 2023

(65) Prior Publication Data

US 2023/0383849 A1    Nov. 30, 2023

Related U.S. Application Data

(60) Provisional application No. 63/335,632, filed on Apr. 27, 2022.

(51) Int. Cl.
*F16K 3/24* (2006.01)

(52) U.S. Cl.
CPC .................................... *F16K 3/246* (2013.01)

(58) Field of Classification Search
CPC .................................. F16K 3/246; F16K 47/08
See application file for complete search history.

(56) References Cited

U.S. PATENT DOCUMENTS

| | | | | |
|---|---|---|---|---|
| 1,954,044 A * | 4/1934 | Guildford | ............... | F16K 25/04 251/210 |
| 3,813,079 A * | 5/1974 | Baumann | ................. | F16K 47/08 251/282 |
| 4,679,592 A * | 7/1987 | Lamb | ....................... | F16K 47/04 137/625.33 |
| 4,860,993 A * | 8/1989 | Goode | .................... | F16K 47/08 137/625.37 |
| 5,803,119 A | 9/1998 | Steinke | | |
| 6,105,614 A | 8/2000 | Bohaychuk et al. | | |
| 8,863,776 B2 * | 10/2014 | Grace | ...................... | F16K 47/08 137/625.33 |
| 9,624,748 B2 * | 4/2017 | Gnanavelu | ............ | E21B 33/076 |
| 10,100,604 B2 * | 10/2018 | Hopper | .................... | E21B 34/04 |
| 2010/0051849 A1 | 3/2010 | Bohaychuk | | |
| 2018/0128294 A1 * | 5/2018 | Sundararajan | .......... | F16K 47/08 |
| 2020/0041036 A1 * | 2/2020 | Sun | ......................... | F16L 55/04 |

* cited by examiner

*Primary Examiner* — Patrick C Williams
(74) *Attorney, Agent, or Firm* — Stetina Brunda Garred & Brucker

(57) ABSTRACT

A control valve includes a valve body and a flow control device having a wall extending around a central axis. A plurality of flow control channels are formed in the wall, with each flow control channel extending in a first direction substantially parallel to the central axis and a second direction substantially perpendicular to the central axis toward an inner surface and terminating between an outer surface and the inner surface at an inner channel surface. A valve plug is moveable relative to the flow control device in a direction substantially parallel to the central axis between a closed position and an open position. In the closed position, the valve plug covers the plurality of flow control channels, and as the valve plug transitions from the closed position toward the open position, the plurality of flow control channels become exposed to receive fluid flow.

19 Claims, 6 Drawing Sheets

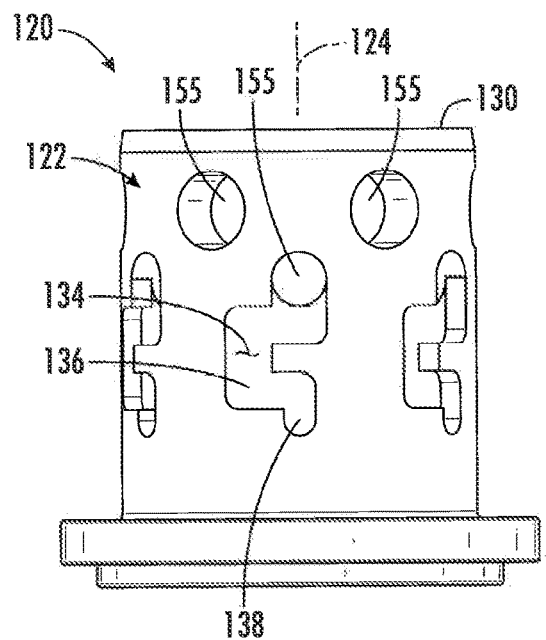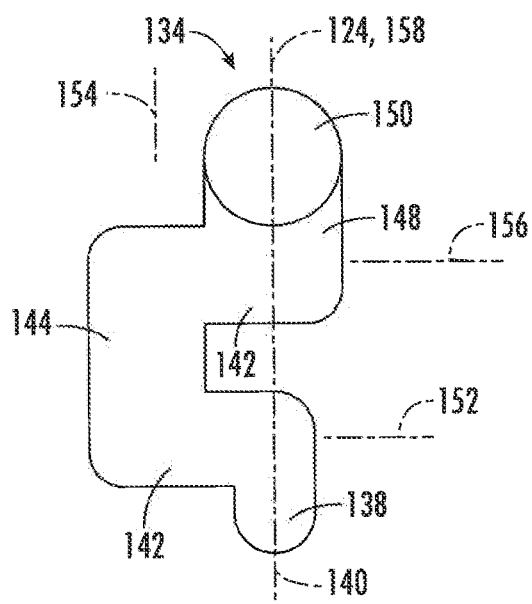
FIG. 7A  FIG. 7B
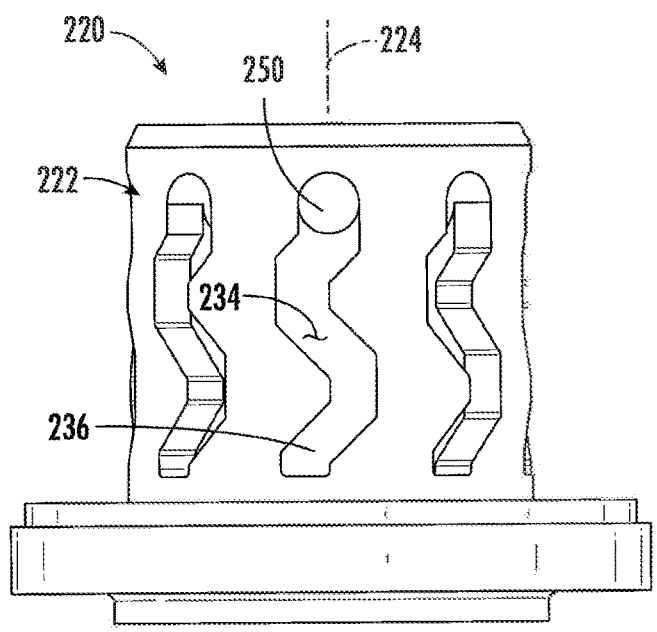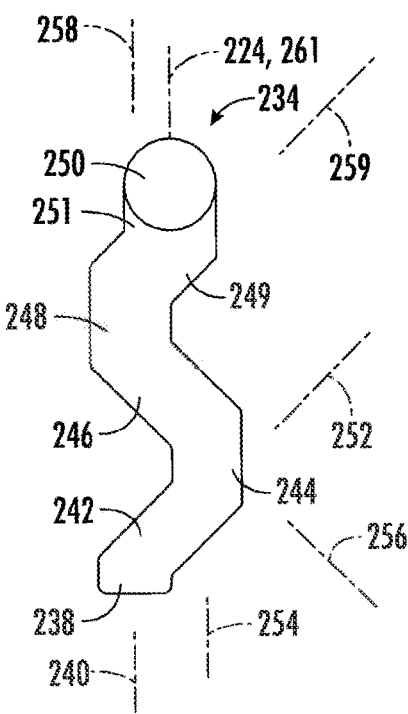
FIG. 8A  FIG. 8B

AXIAL MULTI-STAGE, MULTI-PATH CONTROL VALVE ELEMENT DESIGN FOR EXTERNAL PLUGS

CROSS-REFERENCE TO RELATED APPLICATIONS

The present application claims priority to U.S. Provisional Patent Application Ser. No. 63/335,632 entitled AXIAL MULTI-STAGE, MULTI-PATH VALVE ELEMENT DESIGN FOR EXTERNAL PLUGS filed Apr. 27, 2022, the disclosure of which is incorporated herein by reference.

STATEMENT RE: FEDERALLY SPONSORED RESEARCH/DEVELOPMENT

Not Applicable

BACKGROUND

1. Technical Field

The present disclosure relates generally to a flow control valve, and more specifically, to a plug-type flow control valve having a flow control device having externally located flow channels which may be selectively covered or exposed by the valve plug

2. Description of the Related Art

Fluid control valves are known in the art to include stems and plugs that are linearly displaced during normal operation of the valve. Within these valves, often referred to as linear displacement valves, the stem or plug may be seated against a valve seat to assume a closed position to prevent fluid flow through the valve. The stem or plug may be linearly moved away from the valve seat toward an open position to allow fluid to flow through tortuous passageway(s) provided within the valve. Linear displacement valves may be configured from "over plug flow" wherein fluid flows radially inward into an interior from the exterior. As an alternative to over the plug flow, other linear displacement valves are configured for "under the plug flow" wherein fluid may flow axially upward into an interior of the valve from the exterior thereof.

Many flow control elements that incorporate tortuous pathways, have flow paths that are fully enclosed. This is done by having stacked plates with connecting flow patterns that alternate in the longitudinal and/or transverse directions. These plates are then stacked and compressed together, enclosing the tortuous flow paths. Multiple sets of plates stacked together are used to create the valves flow control element.

One particular drawback associated with conventional flow control elements having fully enclosed tortuous pathways is that they are susceptible to clogging, particularly in dirty service application. For instance, over time, sand or other debris may buildup within the pathway and create an undesirable blockage therein.

Accordingly, there is a need in the art for a flow control device specifically configured to mitigate clogging. Various aspects of the present disclosure address this particular need, as will be discussed in more detail below.

BRIEF SUMMARY

In accordance with one embodiment of the present disclosure, there is provided a control valve comprising a valve body and a flow control device disposed within the valve body. The flow control device includes a wall extending around a central axis, with the wall having an outer surface and an inner surface. The inner surface is disposed radially inward relative to the outer surface. A plurality of flow control channels are formed in the outer surface of the wall, with each flow control channel extending in a first direction substantially parallel to the central axis and a second direction substantially perpendicular to the central axis from the outer surface toward the inner surface and terminating between the outer surface and the inner surface at an inner channel surface.

A valve plug is moveable relative to the flow control device in a direction substantially parallel to the central axis between a closed position and an open position. In the closed position, the valve plug covers the plurality of flow control channels, and as the valve plug transitions from the closed position toward the open position, the plurality of flow control channels become increasingly exposed to receive fluid flow.

The valve plug may include an inner surface sized such that when the valve plug is between the closed position and the open position, the inner surface and the plurality of flow control channels collective define a plurality of flow control passageways.

The flow control element may include a plurality of channel outlet openings within respective ones of the flow control channels and extending through the wall from the inner channel surface to the inner surface of the wall to facilitate fluid communication between the flow control channels and the central passage. Each of the plurality of flow control channels may include an inlet segment extending along an inlet axis generally parallel to the central axis, and each of the plurality of channel outlet openings may be disposed about a respective outlet opening axis that is offset from the inlet axis of the corresponding flow control channel. The plurality of flow control channels may also each include at least one downstream segment extending from the inlet segment along an axis offset from the inlet axis by an angle in the range of 30-60 degrees. The at least one downstream segment may comprise multiple downstream segments extending in series from the inlet segment along axes each offset from the inlet axis by an angle in the range of 30-60 degrees, with the corresponding outlet opening communicating with that one of the downstream segments disposed furthest from the inlet segment. The downstream segments of each of the flow control channels may be of progressively increasing width and/or depth from the inlet segment to the outlet opening.

The flow control element may also include a plurality of auxiliary openings extending through the wall from the outer surface to the inner surface and spaced from the plurality of flow control channels. The plurality of auxiliary openings may be disposed about an outer circumference of the wall at prescribed intervals relative to each other.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 7A is a front view of a flow control device having flow channels corresponding to a second flow path configuration;

FIG. 7B is a front view of the second flow path configuration defined by one of the flow channels shown in FIG. 7A;

FIG. 8A is a front view of a flow control device having flow channels corresponding to a third flow path configuration; and FIG. 8B is a front view of the third flow path configuration defined by one of the flow channels shown in FIG. 8A.

Common reference numerals are used throughout the drawings and the detailed description to indicate the same elements.

DETAILED DESCRIPTION

The detailed description set forth below in connection with the appended drawings is intended as a description of certain embodiments of a fluid flow control valve and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to a fluid control valve having a control element including open, torturous, multi-stage flow channels for use with an external sleeve plug. The design may employ a close tolerance between the open, multi-stage flow path channels on the control element and the external sleeve plug, such that the channels and the plug may cooperatively define a plurality of flow passageways when the plug is moved to expose at least a portion of the channel to the fluid flow. Accordingly, control over the length of the resultant flow passageway, and flow of fluid therethrough may be controlled throughout the valve stroke. The open channel design may help to mitigate clogging of the flow passageway, particularly in dirty service applications, by exposing the flow channel directly to the process fluid. Particulates such as sand and other debris may be removed from the channel by the process fluid. In instances where the debris is unable to be removed by the process fluid during operation, the debris may be removed with the use of a pick or brush during maintenance.

Figure 1:
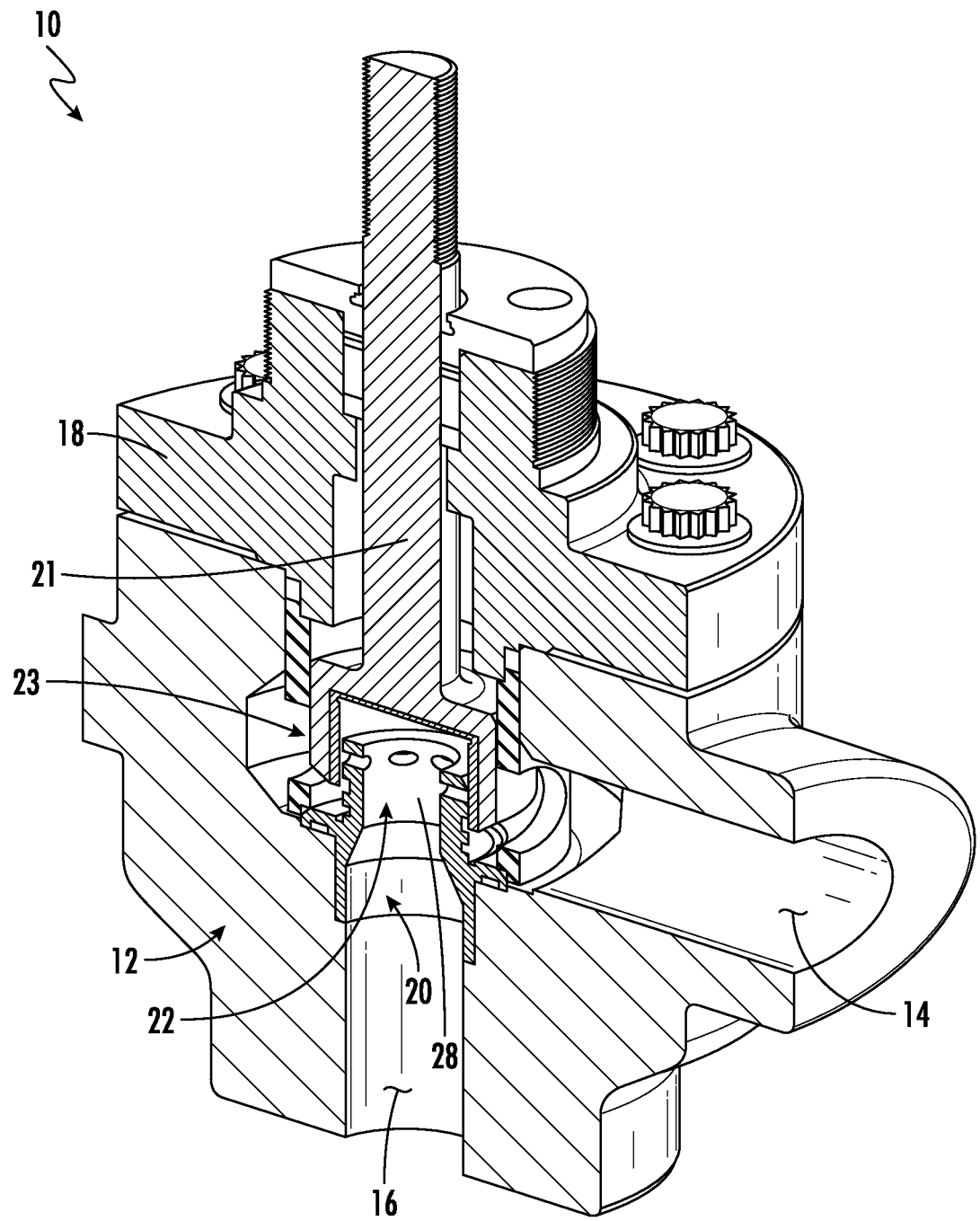
FIG. 1 is an upper perspective, cross-sectional view of a control valve including an exemplary embodiment of a flow control device.
Figure 2:
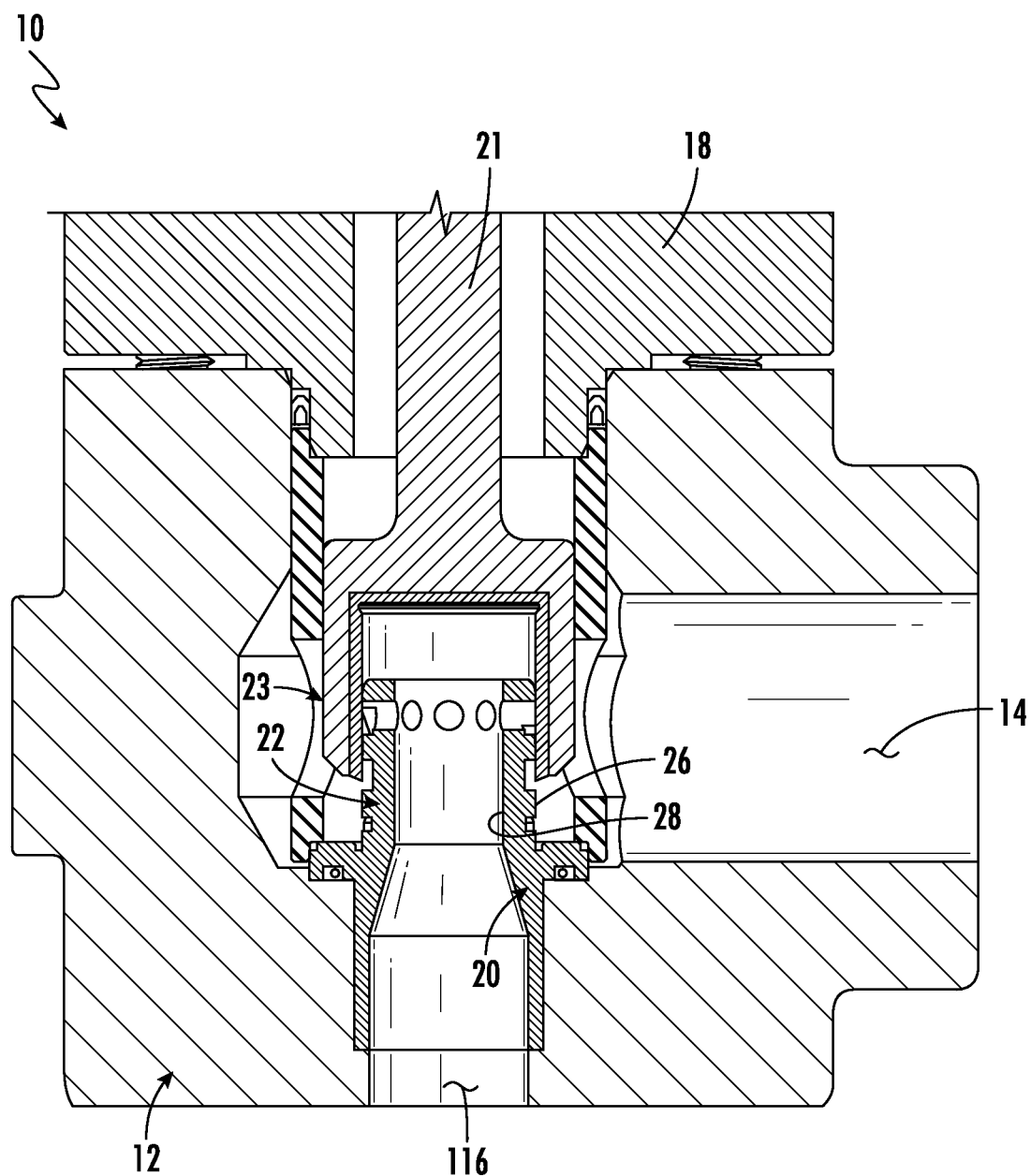
FIG. 2 is a front, cross-sectional view of the control valve.

Referring now to FIGS. 1 and 2, a fluid control valve 10 may include a housing 12 having a fluid inlet 14 and a fluid outlet 16, each of which fluidly communicate with an interior chamber or valve gallery. The valve 10 may additionally include a bonnet 18, which may be attached to the housing 12 and partially enclose the gallery. As seen in FIG. 1, the attachment of the bonnet 18 to the housing 12 may be facilitated using mechanical fasteners comprising a nut and bolt combination, although other attachment mechanisms may also be used.

Disposed within the gallery of the housing 12 is a flow control device 20 and a valve stem 21 having a valve plug 23 coupled thereto. The flow control device 20 is configured to provides flow resistance as fluid flows from the fluid inlet 14 to the fluid outlet 16. The flow control device 20 generally includes an annular, generally cylindrical wall 22 which extends around a central axis 24. The wall 22 includes an outer surface 26 and an inner surface 28, with the inner surface 28 defining a central passage in fluid communication with the fluid outlet 16. The flow control device 20 may include a distal end portion having a distal end surface 30, and a proximal end portion having a seating flange 32 extending radially outward relative to the outer surface 26 of the cylindrical wall 22. The seating flange 32 may interface with the valve plug 23 when the valve plug 23 is in the closed position, as will be described in more detail below.

The flow control device 20 additionally includes a plurality of flow control channels 34 formed on an exterior surface thereof (i.e., within the outer surface 26), with the flow control channels 34 being configured to impart desired flow characteristics on the fluid flowing therethrough. In more detail, each flow control channel 34 may have a length component and a depth component, the length component extending into a first direction which is substantially parallel to the central axis 24 (e.g., in a direction between the proximal and distal end portions), with the depth component extending in a second direction substantially perpendicular to the central axis 24 from the outer surface 26 toward the inner surface 28, and terminating between the outer surface 28 and the inner surface 28 at an inner channel surface 36. As result, the sidewalls defined by each flow control channel extend generally perpendicularly between the outer surface 26 and the inner channel surface 36 thereof.

The configuration of the flow control channels 34 may provide more direct exposure to the service fluid to allow the pressure of the service fluid to unclog debris that may build up within the flow control channel 34. In this regard, the entire length of each flow control channel 34 may be directly exposed to the service fluid, which differs from conventional internally located tortuous flow paths, where the only direct exposure to the service fluid may be at the inlet opening.

The flow control channels 34 may be arranged around the outer circumference of the flow control device 20. In the exemplary embodiment, the flow control channels 34 are substantially evenly spaced about the outer circumference at prescribed intervals, although the scope of the present disclosure is not limited to any number, spacing, or arrangement of the flow control channels 34.

Figure 3:
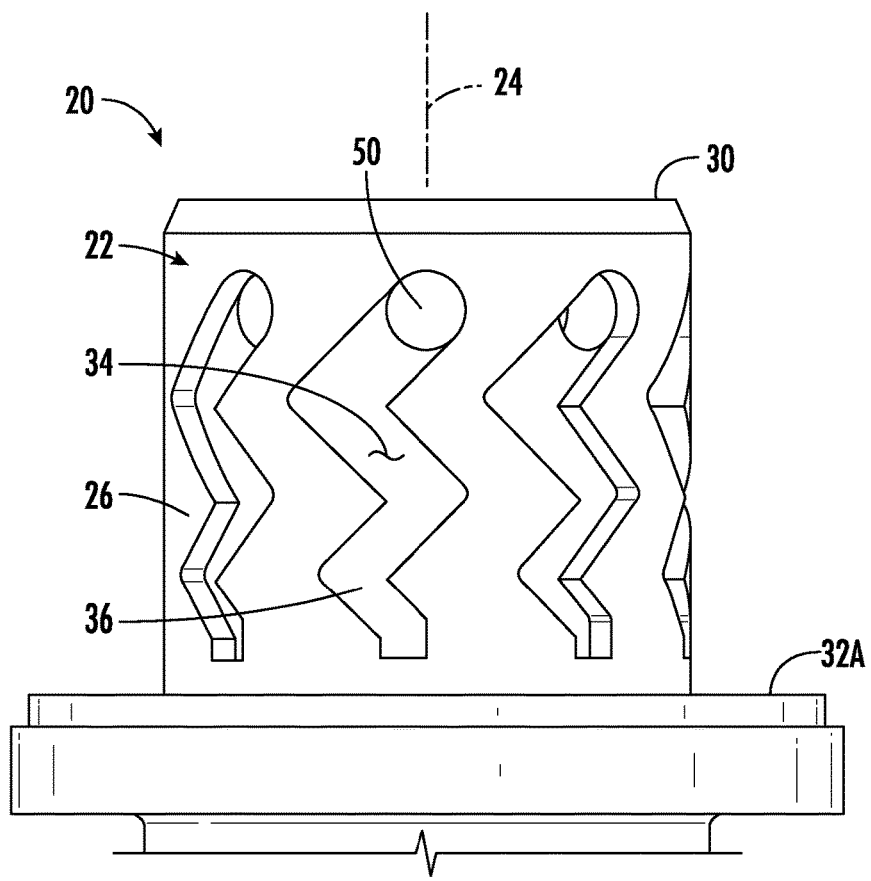
FIG. 3 is a front view of a flow control device having flow channels corresponding to a first flow path configuration.
Figures 4A, 4B, 4C:
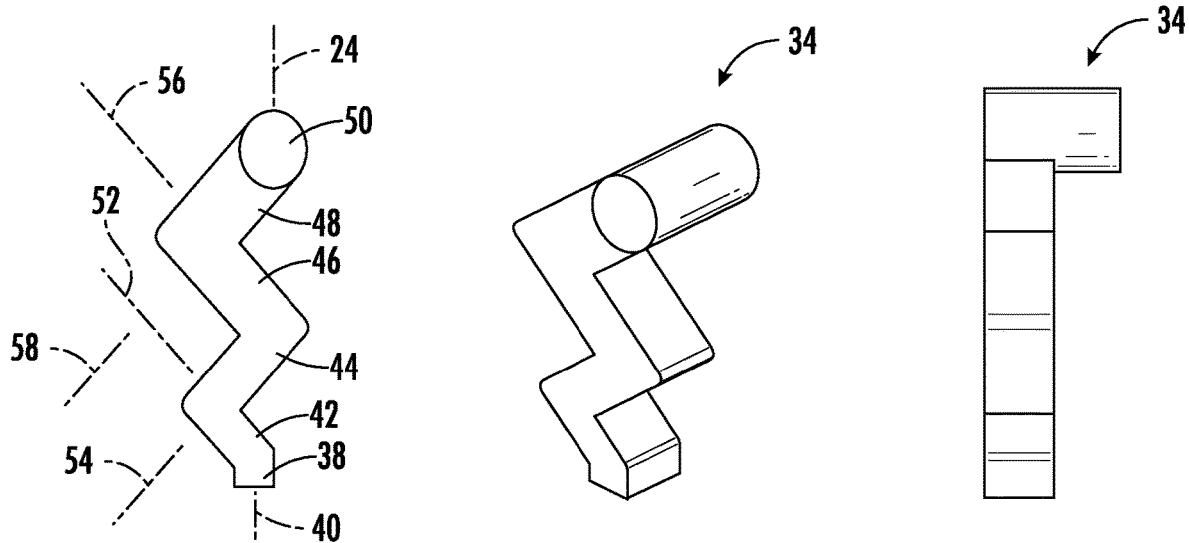
FIG. 4A is a front view of the first flow path configuration defined by one of the flow channels shown in FIG. 3.
FIG. 4B is an upper perspective view of the first flow path configuration shown in FIG. 4A.
FIG. 4C is a side view of the first flow path configuration shown in FIGS. 4A and 4B.

The configuration of the flow control channels 34 depicted as being integrated into the flow control device 20 in FIG. 3, are additionally depicted in an isolated manner FIGS. 4A-4C. As depicted in FIGS. 3-4C, the flow channel configuration includes an inlet segment 38 positioned adjacent the proximal end portion of the flow control device 20, with the inlet segment 38 extending along an inlet axis 40 generally parallel to the central axis 24 from the perspective depicted in FIGS. 3 and 4A. Extending from the inlet segment 38 is a first intermediate segment 42, followed by a second intermediate segment 44, a third intermediate segment 46, a fourth intermediate segment 48, and an channel outlet opening 50. The first intermediate segment 42 extends along a first axis 52 that is angled relative to the inlet axis 40. The second intermediate segment 44 extends along a second axis 54 that is angled relative to first axis 52. The third intermediate segment 46 extends along a third axis 56 that is angled relative to the second axis 54. The fourth intermediate segment 48 extends along a fourth axis 58 that is angled relative to the third axis 56. The angle between the inlet axis 40 and the first axis 52 may be between 30-60 degrees, and more specifically, equal to 45 degrees. The angle between the first axis 52 and the second axis 54 may be 90 degrees, the angle between the second axis 54 and the third axis 56 may be 90 degrees, and the angle between the third axis 56 and the fourth axis 58 may be 90 degrees.

Each channel outlet opening 50 may be located at the end of the fourth intermediate segment 48 of the corresponding flow control channel 34, with the channel outlet opening 50 extending between the inner channel surface 36 and the inner surface 28 of the wall 22. Along these lines, the channel outlet opening 50 preferably has a generally circular configuration defining an axis which extends generally radially or perpendicularly relative to the central axis 24 and serves as a conduit for fluid flowing through the corresponding flow control channel 34 into the central passage of the flow control device 20. In this regard, fluid may be received into the flow control channel 34 at a location upstream from the channel outlet opening 50, flow through the flow control channel 34 toward the channel outlet opening 50, and then exit the flow control channel 34 through the channel outlet opening 50.

In one embodiment, and referring now specifically to FIG. 4A, the channel outlet opening 50 may be configured relative to the inlet segment 38, such that a first tangent of the channel outlet opening 50 is aligned with a first side of the inlet segment, and the center of the channel outlet opening 50 is aligned with a second side of the inlet segment 38. In this regard, the center of the channel outlet opening 50 may not be aligned with the center of the inlet segment 38.

It is also contemplated that each flow control channel 34 may be configured to facilitate expansion of fluid flowing therethrough, and thus, achieve a reduction in fluid pressure. In this regard, as seen in FIGS. 3, 4A and 4B, the distance between corresponding segments of the sidewalls of each flow control channel 34, taken along an axis perpendicular to each pair of sidewall segments which extend in generally parallel relation to each other, may increase from the inlet segment 38 toward the channel outlet opening 50. In other words, the flow control channel 34 may be narrowest at the inlet segment 38 and widest at the fourth intermediate segment 48. Thus, in addition to the length and depth components described above, each flow control channel 34 has a prescribed width component. Those of ordinary skill in the art will recognize that the dimensional parameters associated with any one or more of these length, depth, and width components, may be selectively adjusted as needed to achieve desired energy dissipation characteristics for fluid flowing through the corresponding flow control channel 34.

Figure 5:
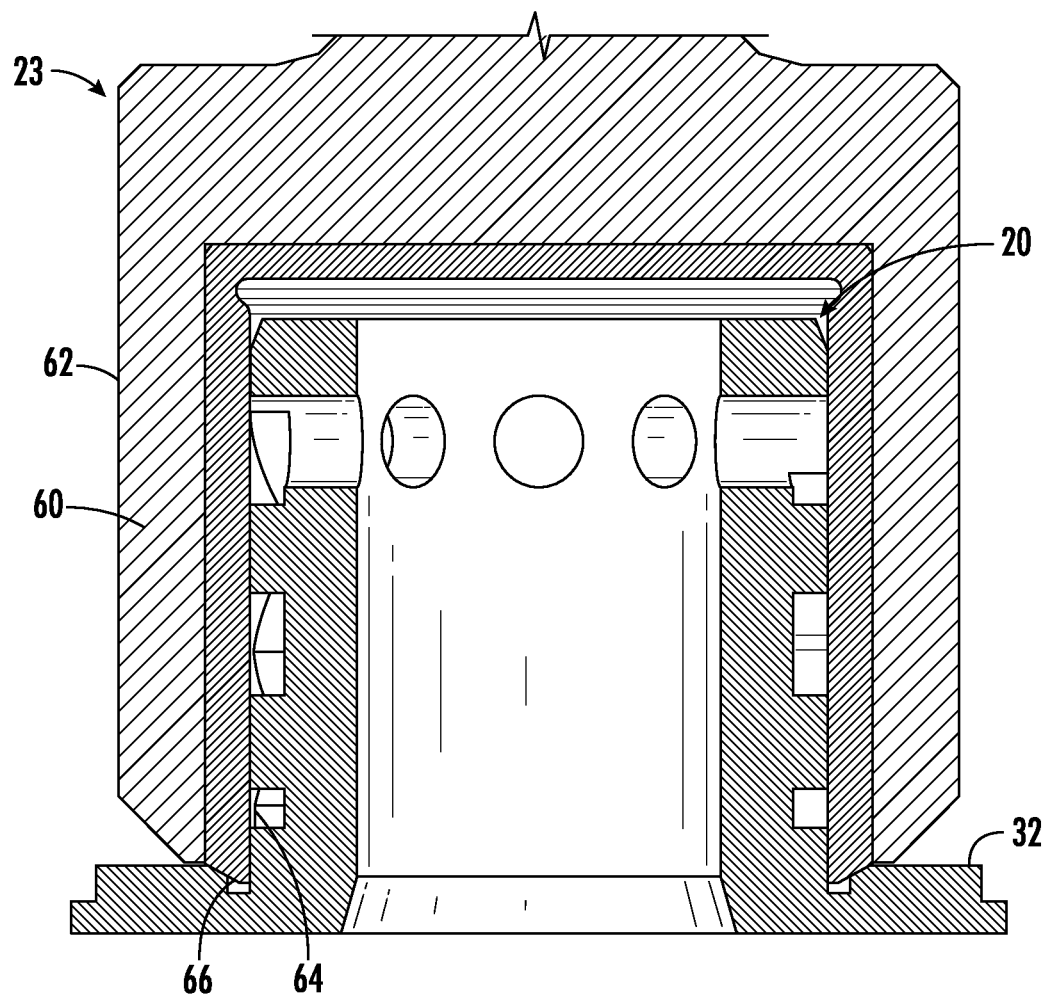
FIG. 5 is a front, cross-sectional view of the flow control device shown in FIG. 3 with the corresponding valve plug of the control valve.

Referring specifically to FIG. 5, the particulars of the valve plug 23 will now be described. The valve plug 23 may include a plug wall 60 that is a generally annular, cylindrical structure having an outer surface 62 and an inner surface 64. The plug wall 60 may include a distal end portion terminating in a seating surface 66 (or seating edge) that interfaces with the seating flange 32 on the flow control device 20 when the plug 23 is in the closed position. The plug 23 may include a proximal end portion connected to a valve stem 21 that may be moved axially along a plug axis, which may be concentrically aligned with the central axis 24 of the flow control device 20.

Figure 6A:
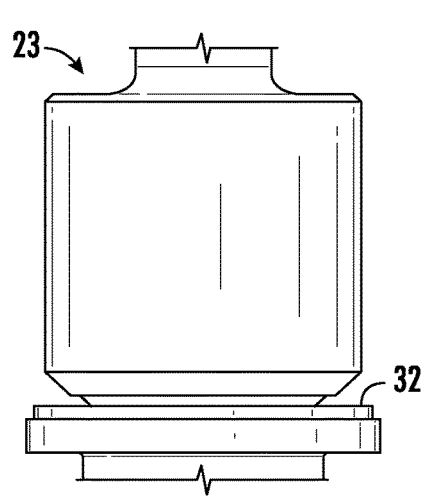
FIGS. 6A-6E depict a progressive transition of the valve plug relative to the flow control drive from a closed position to an open position.

Referring now to FIGS. 6A-6E, the valve plug 23 may be selectively moved relative to the flow control device 20 between a closed position and an open position. FIG. 6A shows the valve plug 23 in the closed position, with the seating surface 66 of the plug wall 60 contacting or being placed in sealing engagement with the sealing flange 32 of the valve plug 23. In the closed position, the plug wall 60 covers the entirety of each flow control channel 34, such that no portion of any flow control channel 34 is open to the process fluid.

Figure 6B:
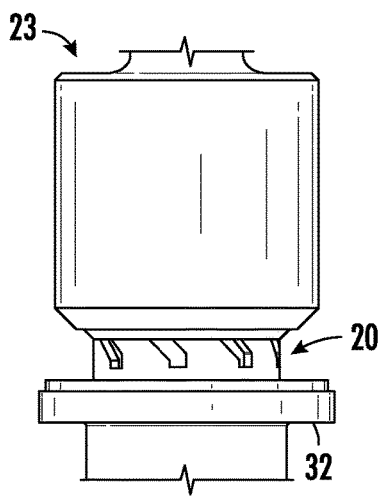

FIG. 6B shows the valve plug 23 in a first intermediate position with the valve plug 23 having been moved from the sealing flange 32 such that a portion of at least some of the flow control channels 34 are exposed to the process fluid. In particular, the inlet segment 38 and the first intermediate segment 42 of the flow channels 34 are exposed, while the second, third, and fourth intermediate segments 44, 46, 48 remain covered by the valve plug 23. The inner surface of the plug 23 bounds the second, third, and fourth intermediate segments 44, 46, 48 to collectively define a flow passageway through which fluid may flow. As fluid flows through the flow passageway, the fluid undergoes at least three turns, as the flow transitions from the second intermediate segment 44 to the third intermediate segment 46 (e.g., turn 1), and then to the fourth intermediate segment 48 (e.g., turn 2), and then through the channel outlet opening 50 into the central passage defined by the flow control device 20 (e.g., turn 3—from a direction along the fourth axis 58 to a direction along an axis about which the channel outlet opening 50 extends).

Figure 6C:
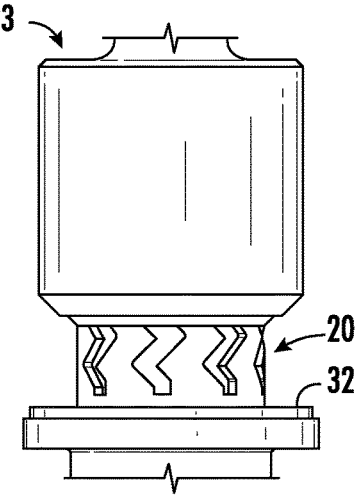

FIG. 6C shows the valve plug 23 in a second intermediate position with the valve plug 23 having been moved from the first intermediate position further away from the seating flange 32 to expose more of each of the flow control channels 34. In particular, the inlet segment 38, the first and second intermediate segments 42, 44, and a portion of the third intermediate segment 46 are exposed, while the remaining portion of the third intermediate segment 46, and the fourth intermediate segment 48 remain covered by the valve plug 23. As fluid flows through each flow passageway, the fluid undergoes at least two turns, as the flow transitions from the third intermediate segment 46 to the fourth intermediate segment 48 (e.g., turn 1), and then through the corresponding channel outlet opening 50 (e.g., turn 2).

Figure 6D:
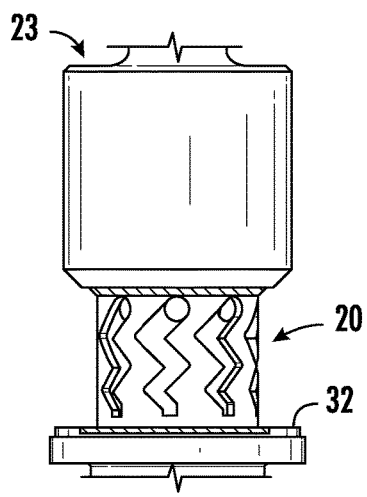

FIG. 6D shows the valve plug 23 in a third intermediate position with the valve plug 23 having been moved from the second intermediate position further away from the seating flange 32 to expose more of each of the flow control channels 34. In particular, the inlet segment 38, the first, second, third, and fourth intermediate segments 42, 44, 46, 48, and a portion of the channel outlet opening 50 are exposed, while the remaining portion of the channel outlet opening 50 remains covered by the valve plug 23. In this regard, with all of the intermediate segments 42, 44, 46, 48 uncovered, and thus, unbounded by the valve plug 23, the flow passageways are no longer defined or constituted by the at least partially covered flow control channels 34. Rather, fluid may flow directly through the exposed portions of the channel outlet openings 50.

Figure 6E:
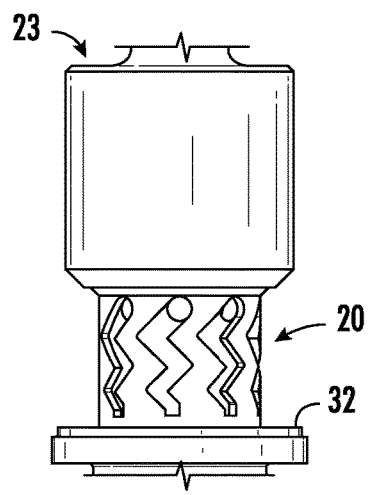

FIG. 6E shows the valve plug 23 in the open position with the valve plug 23 having been moved from the third intermediate position further away from the seating flange 32 to expose or uncover the entirety of each of the flow control channels 34, as well as the channel outlet openings 50. In this regard, fluid may flow directly through the entire, exposed channel outlet openings 50 of the flow control device 20 without having to flow through the flow channels 34.

The exposed portions of the flow control channels 34 depicted in FIGS. 6B-6E may be directly exposed to the service fluid. As such, the pressure of the service fluid may have a cleansing effect by removing any sand or debris that may buildup within the flow control channels 34.

The flow control channels 34 may be arranged such that the channel outlet openings 50 may be positioned in a common plane. In other words, the axis about which each channel outlet opening 50 is disposed may reside in the same plane. However, it is contemplated that in other embodiments, the channel outlet openings 50 may be slightly offset in a direction parallel to the central axis 24 (e.g., the openings 50 may be at different heights) without departing from the spirit and scope of the present disclosure. Similarly, the inlet segments 38 of the flow channels 34 may be varied in different implementations of the flow control device 20. For instance, in the exemplary embodiment, all of the inlet segments 38 are positioned at a common height or aligned on a common plane such that all of the inlet segments 38 may become exposed at the same time when the valve plug 23 is moved to a specific position relative to the flow control device 20. Alternatively, it is contemplated that the inlet segments 38 may be at different heights (e.g., staggered) which may allow one or more inlet segments 38 to become exposed, while other inlet segments 38 may remain covered, and thus, not exposed to the fluid flow. In such an embodiment, the flow passage(s) associated with the exposed inlet segments 38 may be active, as having received fluid, while the covered inlet segments 38 may remain inactive, as having been blocked from the fluid.

It is understood that the positions shown in FIGS. 6B, 6C, and 6D are exemplary intermediate positions, and that in some embodiments, the valve plug 23 may be moved to any position between the closed and open positions to define a flow passageway having a desired length and a desired number of turns.

As indicated above, in addition to variations in the length and position of the flow channels 34, it is additionally contemplated that the configuration of the flow channels 34 may also vary. Referring now specifically to FIGS. 7A and 7B, there is depicted a second embodiment of the flow control device 120 having flow channels 134 that are of a second configuration, different from the first configuration described above. In particular, the flow channels 134 depicted in FIGS. 7A and 7B include an inlet segment 138 extending along an inlet axis 140 generally parallel to a central axis 124 from the perspective depicted in FIG. 7A. Extending from the inlet segment 138 is a first intermediate segment 142, followed by a second intermediate segment 144, a third intermediate segment 146, a fourth intermediate segment 148, and a channel outlet opening 150. The first intermediate segment 142 extends along a first axis 152 that is perpendicular to the inlet axis 140. The second intermediate segment 144 extends along a second axis 154 that is perpendicular to the first axis 152. The third intermediate segment 146 extends along a third axis 156 that is perpendicular to the second axis 154. The fourth intermediate segment 148 extends along a fourth axis 158 that is perpendicular to the third axis 156.

Each channel outlet opening 150 may be located at the end of the fourth intermediate segment 148 of the corresponding flow control channel 134 and extend between an inner channel surface 136 and the inner surface of the wall 122, which may serve as an outlet to fluid flowing through the channel 134.

In addition to the channel outlet openings 150 located in the fourth intermediate segments 148 of respective ones of the flow control channels 134, the flow control device 120 may further include auxiliary openings 155 outside of the flow channels 134. As shown in FIG. 7A, the auxiliary openings 155 may be positioned in a region of the flow control device 120 extending between the flow channels 134 and the distal end surface 130. The auxiliary openings 155 each extend between the outer and inner surfaces of the wall 122. Along these lines, each auxiliary opening 155 preferably has a generally circular configuration defining an axis which extends generally radially or perpendicularly relative to the central axis 124 and serves as a conduit for fluid flowing from the outer surface of the wall 122 directly into the central passage of the flow control device 120 defined by the inner wall thereof. However, each auxiliary opening may have an alternative shape (e.g., square, triangular, etc.) without departing from the spirit and scope of the present disclosure. These auxiliary openings 155 may allow for increased flow capacity through the flow control device 120. The auxiliary openings 155 may be configured such that when the valve plug 23 is in the fully open position, the channel outlet openings 150, as well as the auxiliary openings 155 may be exposed to the fluid flow. Thus, fluid may flow simultaneously through the channel outlet openings 150, as well as through the auxiliary openings 155. However, the valve plug 23 may be able to assume a partially open position, wherein the channel outlet openings 150 may be exposed to allow fluid to flow therethrough, while the auxiliary openings 155 may remain covered, and thus, blocked from direct exposure to the fluid flow.

The position and arrangement of the auxiliary openings 155 may be offset or staggered from the channel outlet openings 150. In particular, each auxiliary opening 155 may be located between two channel outlet openings 150 in a circumferential direction. However, in an alternative embodiment, the auxiliary openings 155 may be aligned with the channel outlet openings 150 in a circumferential direction.

Referring now specifically to FIGS. 8A and 8B, there is depicted a third embodiment of the flow control device 220 having flow channels 234 that are of a third configuration, different from the first and second configurations described above. In particular, the flow channels 234 depicted in FIGS. 8A and 8B include an inlet segment 238 extending along an inlet axis 240 generally parallel to the central axis 224 from the perspective depicted in FIG. 8A. Extending from the inlet segment 238 is a first intermediate segment 242, followed by a second intermediate segment 244, a third intermediate segment 246, a fourth intermediate segment 248, a fifth intermediate segment 249, a sixth intermediate segment 251, and an outlet opening 250. The first intermediate segment 242 may extend along a first axis 252 which defines of angle of approximately 30-60 degrees, and more particularly 45 degrees, relative to the inlet axis 240. The second intermediate segment 244 extends along a second axis 254 which defines of angle of approximately 30-60 degrees, and more particularly 45 degrees, relative to the first axis 252. The third intermediate segment 246 extends along a third axis 256 which defines of angle of approximately 30-60 degrees, and more particularly 45 degrees, relative to the second axis 254. The fourth intermediate segment 248 extends along a fourth axis 258 which defines of angle of approximately 30-60 degrees, and more particularly 45 degrees, relative to the third axis 256. The fifth intermediate segment 249 extends along a fifth axis 259 which defines of angle of approximately 30-60 degrees, and more particularly 45 degrees, relative to the fourth axis 258. The sixth intermediate segment 251 extends along a sixth axis 261 which defines of angle of approximately 30-60 degrees, and more particularly 45 degrees, relative to the fifth axis 259.

At the end of the sixth intermediate segment 251 within each flow control channel 234 is a channel outlet opening 250 that extends between the inner channel surface 236 and the inner surface of the wall 222 serving as an outlet to fluid flowing through the channel 234.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A control valve comprising:
    a valve body;
    a flow control device disposed within the valve body, the flow control device having:
        a wall extending around a central axis, the wall having an outer surface and an inner surface, the inner surface being disposed radially inward relative to the outer surface; and
        a plurality of flow control channels formed in the wall, each flow control channel having a first end portion and a second end portion and extending in a first direction substantially parallel to the central axis and a second direction substantially perpendicular to the central axis from the outer surface toward the inner surface along a length extending entirely between the first end portion and the second end portion and terminating between the outer surface and the inner surface at an inner channel surface; and
    a valve plug moveable relative to the flow control device in a direction substantially parallel to the central axis between a closed position and an open position such that in the closed position the valve plug covers the plurality of flow control channels, and as the valve plug transitions from the closed position toward the open position, the plurality of flow control channels become exposed to receive fluid flow.

2. The control valve recited in claim 1, wherein the valve plug includes an inner surface sized such that when the valve plug is between the closed position and the open position, the inner surface and the plurality of flow control channels collectively define a plurality of flow control passageways.

3. The control valve recited in claim 1, wherein the inner surface of the wall defines a central passage, and the flow control device further includes a plurality of outlet openings which are disposed within respective ones of the flow control channels and extend between the inner channel surface and the inner surface to facilitate fluid communication between the flow control channels and the central passage.

4. The control valve recited in claim 3, wherein the flow control element further includes at least one auxiliary opening extending through the wall from the outer surface to the inner surface.

5. The control valve recited in claim 4, wherein the flow control element includes a plurality of auxiliary openings disposed about a circumference of the wall at prescribed intervals relative to each other.

6. The control valve recited in claim 3, wherein the flow control channels are disposed about a circumference of the wall at prescribed intervals relative to each other.

7. The control valve recited in claim 6, wherein each of the plurality of flow control channels include an inlet segment extending along an inlet axis generally parallel to the central axis, and each of the plurality of outlet openings is disposed about a respective outlet opening axis that is offset from the inlet axis of the corresponding flow control channel.

8. The control valve recited in claim 7, wherein each outlet opening axis is generally perpendicular to the central axis.

9. The control valve recited in claim 7, wherein each of the plurality of flow control channels further includes at least one downstream segment extending from the inlet segment along an axis offset from the inlet axis by an angle in the range of 30-60 degrees.

10. The control valve recited in claim 9, wherein each of the plurality of flow control channels further includes multiple downstream segments extending in series from the inlet segment along axes each offset from the inlet axis by an angle in the range of 30-60 degrees, and the outlet opening communicates with that one of the downstream segments disposed furthest from the inlet segment.

11. The control valve recited in claim 10, wherein the downstream segments of each of the flow control channels are of progressively increasing width from the inlet segment to the outlet opening.

12. A flow control assembly for use in a valve body, the flow control assembly comprising:
    a flow control device configured to be disposable within the valve body, the flow control device having:
        a wall extending around a central axis, the wall having an outer surface and an inner surface, the inner surface being disposed radially inward relative to the outer surface; and
        a plurality of flow control channels formed in the wall, each flow control channel extending in a first direction substantially parallel to the central axis and a second direction substantially perpendicular to the central axis toward the inner surface and terminating between the outer surface and the inner surface at an inner channel surface; and
    a valve plug moveable relative to the flow control device in a direction substantially parallel to the central axis between a closed position and an open position such that in the closed position the valve plug covers the plurality of flow control channels, and as the valve plug transitions from the closed position toward the open position, the plurality of flow control channels become exposed to receive fluid flow,
    wherein the inner surface of the wall defines a central passage, and the flow control device further includes a plurality of outlet openings which are disposed within respective ones of the flow control channels and extend between the inner channel surface and the inner surface to facilitate fluid communication between the flow control channels and the central passage.

13. The flow control assembly recited in claim 12, wherein the flow control element includes a plurality of auxiliary openings extending through the wall from the outer surface to the inner surface and disposed about a circumference of the wall at prescribed intervals relative to each other.

14. The flow control assembly recited in claim 12, wherein the flow control channels are disposed about a circumference of the wall at prescribed intervals relative to each other.

15. The flow control assembly recited in claim 14, wherein each of the plurality of flow control channels include an inlet segment extending along an inlet axis generally parallel to the central axis, and each of the plurality of outlet openings is disposed about a respective outlet opening axis that is offset from the inlet axis of the corresponding flow control channel.

16. The flow control assembly recited in claim 15, wherein each of the plurality of flow control channels further includes at least one downstream segment extending from the inlet segment along an axis offset from the inlet axis by an angle in the range of 30-60 degrees.

17. The flow control assembly recited in claim 16, wherein each of the plurality of flow control channels further includes multiple downstream segments extending in series from the inlet segment along axes each offset from the inlet axis by an angle in the range of 30-60 degrees, and the outlet opening communicates with that one of the downstream segments disposed furthest from the inlet segment.

18. The flow control assembly recited in claim 17, wherein the downstream segments of each of the flow control channels are of progressively increasing width from the inlet segment to the outlet opening.

19. A flow control assembly for use in a valve body, the flow control assembly comprising:
a flow control device configured to be disposable within the valve body, the flow control device having:
a wall extending around a central axis, the wall having an outer surface and an inner surface, the inner surface being disposed radially inward relative to the outer surface; and
a plurality of flow control channels formed in the wall, each flow control channel extending in a first direction substantially parallel to the central axis and a second direction substantially perpendicular to the central axis toward the inner surface and terminating between the outer surface and the inner surface at an inner channel surface; and
a valve plug moveable relative to the flow control device in a direction substantially parallel to the central axis between a closed position and an open position such that in the closed position the valve plug covers the plurality of flow control channels, and as the valve plug transitions from the closed position toward the open position, the plurality of flow control channels become exposed to receive fluid flow, the valve plug including an inner surface sized such that when the valve plug is between the closed position and the open position, the inner surface and the plurality of flow control channels collectively define a plurality of flow control passageways.

* * * * *